United States Patent [19]

Kimoto et al.

[11] 4,140,598

[45] Feb. 20, 1979

[54] MIRROR FINISHING

[75] Inventors: Yasuo Kimoto, Fujiidera; Katsunori Tamiya, Kobe; Shoichi Honda, Osaka, all of Japan

[73] Assignee: Hitachi Shipbuilding & Engineering Co., Ltd., Osaka, Japan

[21] Appl. No.: 798,477

[22] Filed: May 19, 1977

[30] Foreign Application Priority Data

| Jun. 3, 1976 | [JP] | Japan | 51-65441 |
| Jun. 25, 1976 | [JP] | Japan | 51-75700 |
| Jul. 22, 1976 | [JP] | Japan | 51-88005 |
| Sep. 29, 1976 | [JP] | Japan | 51-117740 |

[51] Int. Cl.$^2$ .................. C25F 3/16; B23P 1/10
[52] U.S. Cl. .................. 204/129.4; 204/129.46; 204/129.7; 204/224 R; 204/224 M
[58] Field of Search .......... 204/129.46, 224 M, 129.1, 204/129.7, 129.4, 224 R

[56] References Cited

U.S. PATENT DOCUMENTS

| 2,965,556 | 12/1960 | Damgaard | 204/129.46 X |
| 3,442,784 | 5/1969 | Wieck | 204/129.46 X |
| 3,448,023 | 6/1969 | Bell | 204/224 M X |
| 3,474,013 | 10/1969 | Inoue | 204/224 M X |
| 3,658,682 | 4/1972 | Fulkerson et al. | 204/224 M |
| 4,013,526 | 3/1977 | Inoue | 204/224 M X |

Primary Examiner—John H. Mack
Assistant Examiner—D. R. Valentine
Attorney, Agent, or Firm—Birch, Stewart, Kolasch & Birch

[57] ABSTRACT

The present invention discloses mirror finishing comprising, forming an electrode tool provided with an electrode and abrasive matter, connecting the tool electrode and a workpiece to the cathode and to the anode of a direct current power supply or pulse power supply respectively, supplying an electrolyte to a gap between the electrode tool and the workpiece, sliding while pressing the electrode tool to the surface of the workpiece, and removing the anodic passive films produced on the convexed portions of the surface by electrolysis, by the polishing action of the abrasive matter. In addition, the tool electrolyzes preferentially the convexed portions of the surface to be polished, whereby the electrolytic operation is combined with abrasive polishing by abrasive matter so as to finish the surface to a mirror polished surface.

20 Claims, 20 Drawing Figures

MIRROR FINISHING

BACKGROUND OF THE INVENTION

The present invention relates to mirror finishing in which electrolytic polishing and abrasive polishing by abrasive matter are combined with each other, thereby to give final mirror touches to the polished surface of the workpiece.

In addition to buffing, electro-polishing has been used for surface finishing of, for example, stainless steel. In the conventional electro-polishing, a workpiece is immersed in an electrolyte bath, while being faced to an electrode. In this method, hydrochloric acid or sulfuric acid is used as electrolyte, in which a current of anode current density of 0.2 to 0.7 A/cm$^2$ is supplied thereby to finish the surface of workpiece to a mirror polished surface.

The electro-polishing is thus efficient for treating surfaces of relatively small area workpieces. However, there are some technical and economical problems in putting this method to practical use for polishing the inner faces of relatively large area vessels, due to large-scaled power supply and the electrolyte facilities required. In addition, the lack of uniformity in anode current density and low polishing speed due to small anode current density present problems.

It is an object of the present invention to give final lustrous mirror touches of high quality to the polished surface of a workpiece by combining electrolytic polishing with abrasive polishing by abrasive matter.

It is another object of the present invention to provide a mirror finishing method to be applied to, for example, stainless steel, with remarkable effect.

It is a further object of the present invention to simplify operation to one process for improving working efficiency.

It is still another object of the present invention to easily and economically polish large area workpieces, including large-sized vessels.

It is still a further object of the present invention to enable a partial modification work.

Other objects and further scope of applicability of the present invention will become apparent from the description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF EXPLANATION OF THE DRAWINGS

The present invention will become more fully understood from the detailed description given hereinbelow and the accompanying drawings which are given by way of illustration only, and thus are not limitative of the present invention, and wherein:

FIG. 5 shows a major portion of a first form of an electrode tool, (a) being a bottom view thereof and (b) being a sectional view taken along the line S-S' in (a);

FIG. 12 shows a forth form of an electrode tool, (a) being a bottom view thereof and (b) being a sectional view taken along the line T-T' in (a);

FIG. 15 shows a fifth form of an electrode tool, (a) being a bottom view thereof, (b) being a sectional view taken along the line U-U' in (a) and (c) being a bottom view of only the electrode.

DETAILED DESCRIPTION OF THE INVENTION

The description hereinbelow discusses in detail the mirror finishing in accordance with the present invention, referring to the accompanied drawings showing the embodiments thereof.

Figure 1:
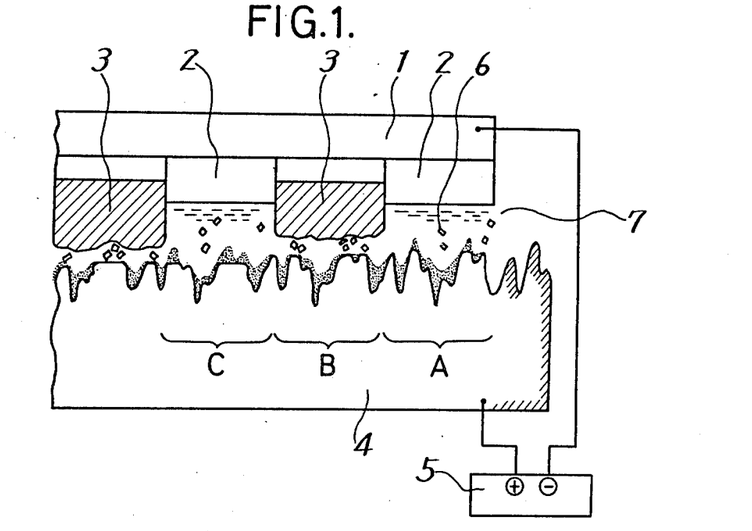
FIG. 1 is an explanatory diagram of the principle of mirror finishing in accordance with the present invention.

FIG. 1 shows the principle of the mirror finishing in accordance with the present invention, an electrode tool 1 comprises electrode 2 and abrasive matter 3 alternately disposed one beside the other. The electrode tool 1 and is connected to a direct current power supply 5 with the electrode 2 as the cathode and a workpiece 4 as the anode. Thus a direct current passes through the gap between the electrode 2 and the workpiece 4.

While keeping a predetermined gap distance between the electrode 2 and the surface of the workpiece 4, the electrode 1 is pressed to the workpiece 4, and electrolyte 7 in which abrasive powder 6 is mixed, is supplied into the gap between the electrode tool 1 and the surface to be polished. Thereafter the electrode tool 1 is slid at a predetermined speed.

As shown in the portion A of FIG. 1, the convexed portions of the surface to be polished are electrolysed and anodic passive films are produced at the concaved portions and small convexed portions of the surface which are spaced relatively far from the electrode tool. As shown in the portion B of FIG. 1, the anodic passive films produced at the small convexed portions are then scraped off by abrasive powder 6 and the abrasive matter 3, and current is concentratedly applied to the small convexed portions at the adjacent electrode 2. As shown in the portion C of FIG. 1, the small convexed portions are then preferentially electrolysed, and these processes are repeated thereafter.

It can be therefore said that according to the present invention, the anodic passive films are scraped off by abrasive action of abrasive powder and the abrasive matter for accelerating electrolysis, thereby to finish the surface to a mirror polished surface.

The abrasive matter 3 may be buff or abrasive cloth which is suitable for use. When using abrasive matter 3 to which abrasive powder has previously adhered, a similar effect may be obtained without mixing abrasive powder in the electrolyte 7. Also, a similar effect may be obtained when using a pulse power supply instead of the direct current power supply above-mentioned.

The description hereinbelow discusses the relationship between surface roughness and a quantity of abrasive powder mixed in the electrolyte.

Figure 2:
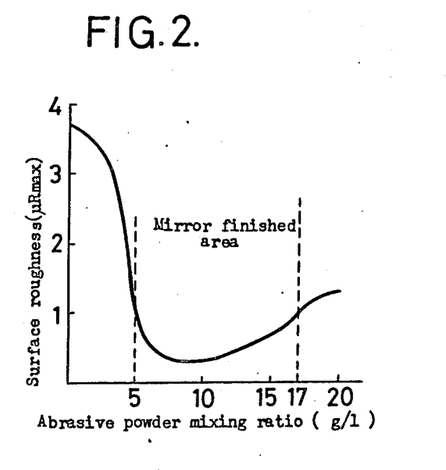
FIG. 2 shows a relationship between surface roughness and the quantity of abrasive powder to be mixed in an electrolyte.

Upon study of variation in surface roughness, while changing a quantity of abrasive powder to be mixed in the electrolyte, their relationship shown in FIG. 2 was observed. Namely, FIG. 2 illustrates the effect of abrasive powder of particle degree JIS #600 to #1500 when mixed in electrolyte at a ratio of 0 to 20 g per one liter electrolyte. As clearly shown in FIG. 2, an lustrous mirror surface having surface roughness of not more than 1 $\mu$m R Max. may be obtained when the abrasive powder is mixed at a ratio of 5 to 17g per one liter electrolyte.

Next, a test of finishing stainless steel (JIS SUS 304) was carried out. This test used a 150mm dia. electrode tool (electrode area 177cm$^2$ with 40 cm$^2$ area of naked electrodes in the cross shape to which abrasive matter is not attached), abrasive powder of particle degree JIS #600 to #1500 was mixed in electrolyte, and a 20% sodium nitrate (NaNO$_3$) solution was supplied as electrolyte at a ratio of 3 to 5 liters/min. A direct current voltage of 3 to 15V was applied to the electrode, and the gap distance between the electrode and the workpiece was changed from 0.2 to 2.5mm.

According to the test, it has been found that a clean mirror surface may be obtained with applied voltage of not more than 12V, when the electrode tool having an area four times larger than that of the naked electrodes is pressed to the surface to be polished at a contact pressure of 0.2 to 0.4 kgf/cm$^2$ and rotated at tangential velocity of 150 to 300m/min. In addition, the tool is slid across the surface to be polished, with the gap distance fixed to 1 mm. However, it has been also found that the polishing speed is too slow to be practical where applied voltage is not more than 5 V.

Figure 3:
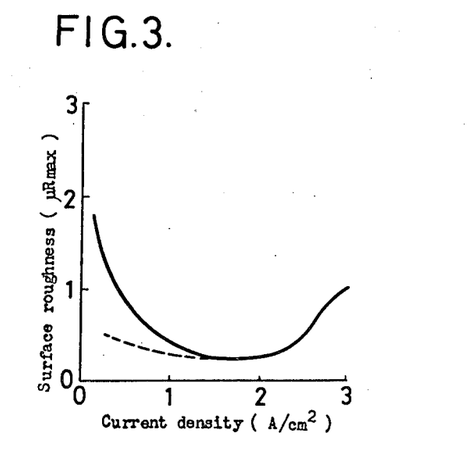
FIG. 3 shows a relationship between surface roughness and a current density.

The description hereinbelow discusses the relationship between surface roughness with respect to current density (electrolytic current/naked electrode area). FIG. 3 shows the relationship of surface roughness to current density obtained in the test, in which a stainless steel of surface roughness of 3 to 5 $\mu$m R Max. was used as the workpiece and a 20% NaNO$_3$ solution was used as the electrolyte. A voltage of 8V was applied. In FIG. 3, a solid line shows the result when polishing time was 1 min., while a dotted line shows that of polishing time being 1 min. or more.

It has been found according to FIG. 3 that a clean mirror surface of not more than 0.5 $\mu$m R Max. may be obtained when current density is not more than 2.5 A/cm$^2$. However, where current density is from 0.5 to 1 A/cm$^2$, polishing time of 3 to 5 min. is required.

On the other hand, a current may greatly vary with the gap distance, applied voltage and electric conductivity of the electrolyte. Upon a study of properties of the polished surface by changing the gap distance from 0.2 to 2.5mm, it has been found that a suitable gap distance is from 0.5 to 1.5mm, in view of followability to undulation of surface to be polished and suitable applied voltage value.

Figure 4:
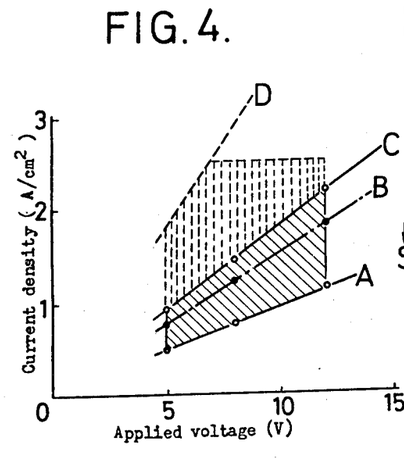
FIG. 4 shows a relationship between an applied voltage and a current density.

FIG. 4 shows variation in current density with respect to variation in applied voltage. In FIG. 4, the lines A, B and C show the test results, using a 10%, 20% and 25% NaNO$_3$ solution (% by weight) as electrolyte respectively, with the gap distance of 1mm. The line D shows the test results, using a 25% NaNO$_3$ solution as electrolyte with the gap distance of 0.5mm.

As shown in FIG. 4, where a 10% to 25% NaNO$_3$ solution was used as electrolyte and the gap distance was 1 mm, it has been found that the most preferred current density for polishing is 0.5 to 2.5 A/cm$^2$ within the range of the applied voltage from 5 to 12 V.

The description hereinbelow discusses the first form of an electrode tool to be used in the mirror finishing in accordance with the present invention.

Figures 5A, 5B:
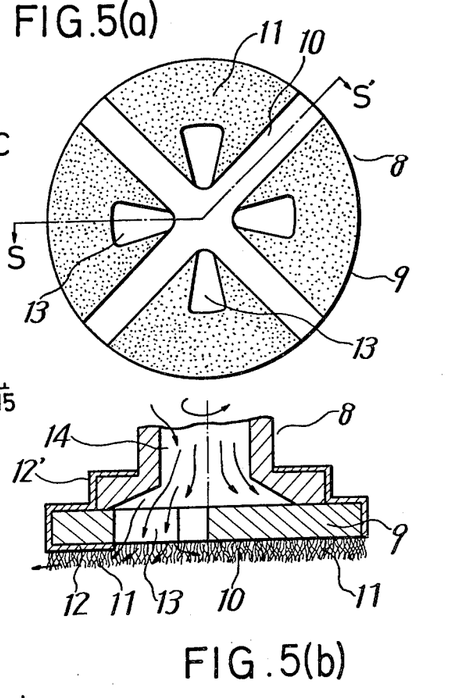

In FIG. 5, an electrode tool 8 is connected to a driving shaft and rotated by a driving device. A circular electrode 9 is formed under the electrode tool 8 and naked electrodes 10 are disposed in the cross shape under the electrode 9. Also under the electrode 9 electrically insulated, water-permeable and resilient abrasive matter 11 such as buff or abrasive cloth is partially attached, to which abrasive powder of particle degree JIS #600 to #1500 is adhered. Namely, said naked electrodes 10 are formed at places where no abrasive matter is attached. Electrically insulating adhesives 12 attach the abrasive matter 11 to the electrode 9, and form insulating films 12' when applied to the peripheral surfaces of the electrode 9 and the electrode tool 8, thereby to prevent useless electric leak from the periphery of the electrode tool 8. A plurality of electrolyte outlets 13 are provided in the electrode 9 therethrough, and an electrolyte inlet 14 is provided at the central upper portion of the electrode tool 8 and communicates with the outlets 13. The electrolyte is supplied in the direction of arrow as shown in FIG. 5 (a).

In the electrode tool shown in FIG. 5, an electrode with a diameter of 150 mm (electrode area 177 cm$^2$) is used, the thickness of abrasive matter is 0.5 to 1 mm, a 20% NaNO$_3$ solution is used as electrolyte, which is supplied to the electrode tool at a ratio of 3 to 5 liters/min., a direct current voltage of 7 to 8 V is applied to the electrode and to the workpiece, the electrode is rotated at a tangential velocity of 180 m/min. and pressed to the workpiece at 0.2 kgf/cm$^2$. In such conditions, a study of variations in surface roughness and current was made on 3 to 5 $\mu$m R Max. stainless steel as the workpiece, by changing an area ratio of the naked electrodes with respect to the abrasive matter.

Figure 6:
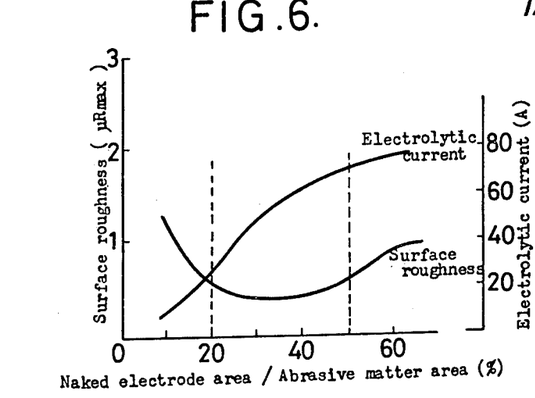
FIG. 6 shows a relationship between the ratio of an naked electrode area relative to an abrasive matter area and surface roughness & electrolytical current.

The results are shown in FIG. 6, according to which, although current is increased as the area ratio of the naked electrodes with respect to the abrasive matter is increased, a mirror surface of not more than 0.5 $\mu$m R Max. may be obtained within the area ratio of 20 to 50% with high electrolytic current efficiency.

Figure 7:
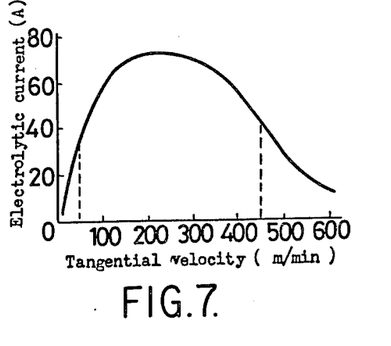
FIG. 7 shows a relationship between electrolytical current and tangential velocity of the electrode tool.

FIG. 7 shows variation in electrolytic current by changing the tangential velocity of the electrode tool with contact pressure of the electrode tool to the workpiece fixed to 0.2 kgf/cm$^2$.

As shown in FIG. 7, the most preferred tangential velocity of the electrode tool is 50 to 450 m/min.

Figure 8:
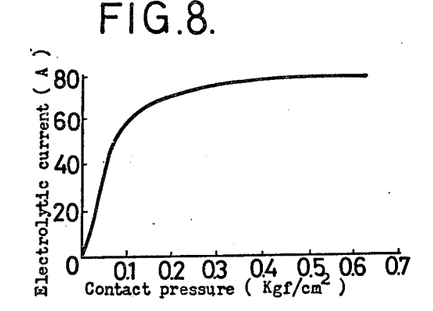
FIG. 8 shows a relationship between electrolytical current and contact pressure of the electrode tool.

FIG. 8 shows variation in electrolytic current by changing the contact pressure of the electrode tool to the workpiece with the tangential velocity of the electrode tool fixed to 180 m/min. As shown in FIG. 8, the most preferred contact pressure is within 0.05 to 0.4 kgf/cm$^2$.

Figure 9:
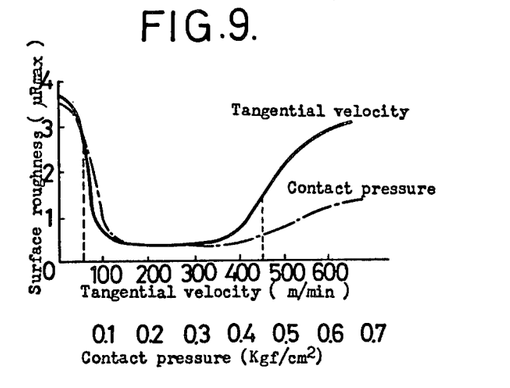
FIG. 9 shows a relationship between surface roughness and contact pressure & tangential velocity of the electrode tool.

FIG. 9 shows the effect of the tangential velocity and contact pressure of the electrode tool on the surface roughness of a workpiece of 3 to 4 μm R Max. stainless steel (JIS SUS 304). In the tests, tangential velocity was changed with polishing time fixed to one minute and contact pressure fixed to 0.2 kgf/cm$^2$, and contact pressure was changed with tangential velocity fixed to 180 m/min.

As shown in FIG. 9, a mirror surface of 0.2 to 0.4 μm R Max. may be obtained in one process with the electrode tool having a tangential velocity of 50 to 450 m/min. and a contact pressure of 0.05 to 0.4 kgf/cm$^2$.

Description will be further made in detail of the shape of electrode tool.

Figure 10:
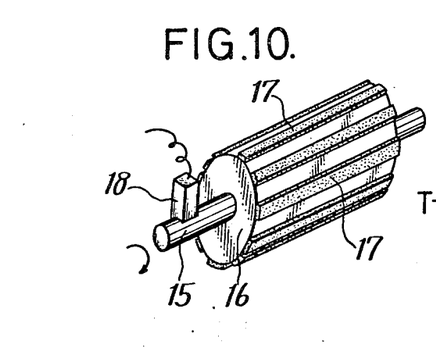
FIG. 10 is a perspective view of a second form of an electrode tool.

Besides a circular electrode as shown in FIG. 5, an electrode may also be in the roll or cylinderical shape as shown in FIG. 10. A plurality of abrasive materials or matters 17 are mounted on the circumferential surface of the roll-shaped electrode 16 having a metallic rotary shaft 15 therein. The abrasive matters 17 are equally spaced axially of the rotary shaft 15, to which a brush 18, which is connected to the current circuit, is slidably mounted.

Figure 11:
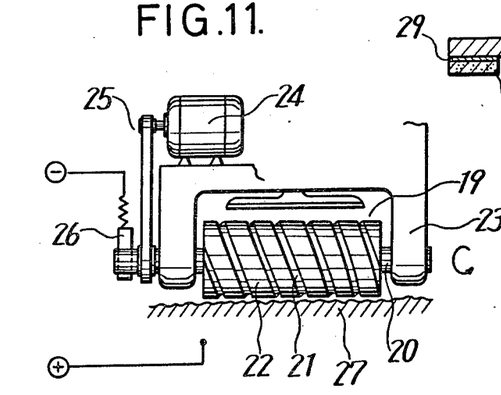
FIG. 11 is a front view of equipment using a third form of an electrode tool.

FIG. 11 shows equipment in which another form of an electrode tool is utilized. An electrode tool 19 comprises an electrode 21 spirally formed on the circumferential surface of a rotary shaft 20 and abrasive matter 22 spirally wound in the groove. The rotary shaft 20 is supported by a frame 23 of the equipment and is rotated by a rotary driving device 25 equipped with a motor 24. A brush 26, which is connected to the current circuit, is slidably mounted to the rotary shaft 20 and the cathode of a direct current power supply is connected to the brush 26, while the anode is connected to a workpiece 27.

Figures 12A, 12B:
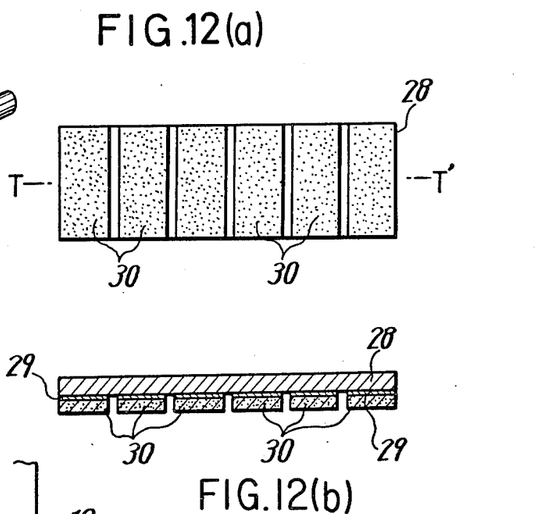

FIG. 12 shows a band-shaped electrode tool, in which abrasive materials or matters 30 are spacedly adhered under a rectangle-shaped electrically conductive electrode plate 28 through electrically insulating material 29. An electrode tool shown in FIG. 12 may also be formed in the endless belt shape.

Figure 13:
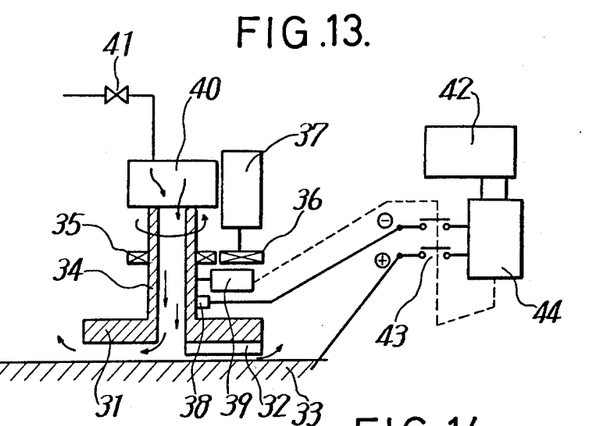
FIG. 13 is an explanatory diagram of equipment in which a direct current power supply for electrolysis may be cut off.

FIG. 13 shows equipment provided with a controlling system in which electrolytic current is adapted to be cut off when the relative velocity of the electrode tool and the workpiece becomes less than a predetermined value, whereby efficient and safe mirror finishing may be carried out.

In FIG. 13, abrasive material or matter 32 is attached to the lower surface of the circular tool electrode 31. A workpiece 33 is disposed adjacent to the electrode 31 and spaced a predetermined distance therefrom. The electrode 31 is mounted to the lower end of a cylindrical main shaft 34. A gear 35 is formed on the circumferential surface of the main shaft 34, and a gear 36 is provided to engage the gear 35. A driving device 37 rotates the electrode 31 together with the main shaft 34 through the gears 35 and 36. A brush 38 is connected to the cathode of a direct current power supply and slidably mounted to the main shaft 34, and the anode of the direct current power supply is connected to workpiece 33. A detector 39 detects a rotation frequency or a rotation velocity of the electrode 31, and is adapted to give a signal when the rotation velocity of the electrode 31 becomes less than a predetermined value. A rotary joint 40 is provided on the main shaft 34 for supplying an abrasive powder-containing electrolyte to the gap between the electrode 31 and the workpiece 33 through the main shaft 34. A stop valve 41 is provided for supplying or stopping the supply of the electrolyte to the rotary joint 40. A direct current power supply is generally designated by 42, and, as mentioned earlier, through the switch 43, the anode is connected to the workpiece 33 and the cathode is connected to the electrode 31 through the brush 38. An overcurrent detector 44 detects an overcurrent of the direct current power supply 42, and is adapted to give a signal when a current of more than a predetermined value flows, thereby to open the switch 43. The switch 43 may also be opened by signals given by the detector 39.

In this arrangement, when the relative velocity of the electrode 31 to the workpiece 33, namely the tangential velocity of the electrode 31, becomes less than a predetermined value, for example, 20 m/min., the detector 39 gives a signal, thereby to open the switch 43 for cutting off the power supply for electrolysis, thereby to prevent damage to the surface to be polished due to unevenness of the electrolysis or overcurrent.

As mentioned earlier, the most preferred finish surface may be obtained when the contact pressure of the electrode tool to the workpiece is within the range from 0.05 to 0.4 kgf/cm$^2$, particularly at 0.2 kgf/cm$^2$. In order to keep the contact pressure constant and to facilitate transport of the equipment or to give portability to the equipment at the same time, it may be necessary to limit the weight of the entire equipment. Consequently the size of the electrode tool should be changed dependent on the use. Furthermore, it will be desirable to readily adjust the contact pressure.

Figure 14:
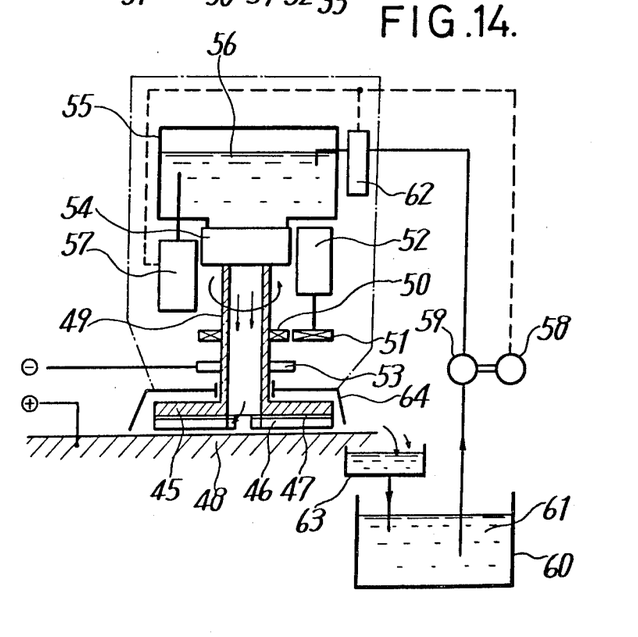
FIG. 14 is an explanatory diagram of equipment in which the quantity of an electrolyte may be adjusted.

FIG. 14 shows equipment provided with a controlling system, by which a mirror finishing method meeting such requirements of the present invention may be carried out.

In FIG. 14, abrasive material or matter 46 is attached to the lower surface of a circular tool electrode 45 with adhesives 47, and a workpiece 48 is disposed adjacent to the electrode 45 and spaced a predetermined distance therefrom. A main shaft 49 is provided at the lower end thereof with the electrode 45. A gear 50 is formed on the circumferential surface of the main shaft 49 and a gear 51 is disposed to engage the gear 50. A driving device 52 rotates the main shaft 49 through the gears 50 and 51. A brush 53 is connected to the cathode of the direct current power supply and slidably mounted to the main shaft 49, and the anode of the direct current power supply is connected to the workpiece 48. A rotary joint 54 is disposed on the main shaft 49, and functions to supply an electrolyte 56 within an electrolyte tank 55 to the main shaft 49 without leakage of the electrolyte, and also to adjust the flowing quantity of the electrolyte. A detector 57 detects the quantity of the electrolyte 56 within the electrolyte tank 55, and is adapted to give a signal when the quantity of electrolyte 56 within the electrolyte tank 55 exceeds over or decreases less than a predetermined value. A motor 58 is turned on or off by detection signals given by the detector 57, and a pump 59 is driven by the motor 58 for supplying an electrolyte 61 stored in an electrolyte storage tank 60 to said electrolyte tank 55. An electro-magnetic valve 62 is opened or closed by detection signals given by the detector 57. The quantity of electrolyte 56 within the electrolyte tank 55 can be kept constant by the opening and closing operation of the electro-magnetic valve 62. The electrolyte is supplied to the gap between the electrode 45 and the workpiece 48 from the main shaft 49, and thereafter recovered into a recovery tank 63. The electrolyte within the recovery tank 63 will be then sent to the electrolyte storage tank 60 so as to be circulated. For the electrode 45 a cover 64 is provided to prevent scattering of the electrolyte.

As shown in FIG. 14, the electrolyte tank 55 is attached to the equipment for controlling the quantity of the electrolyte within the electrolyte tank 55, thereby to maintain a constant contact pressure of the electrode tool to the workpiece.

Figures 15A, 15B:
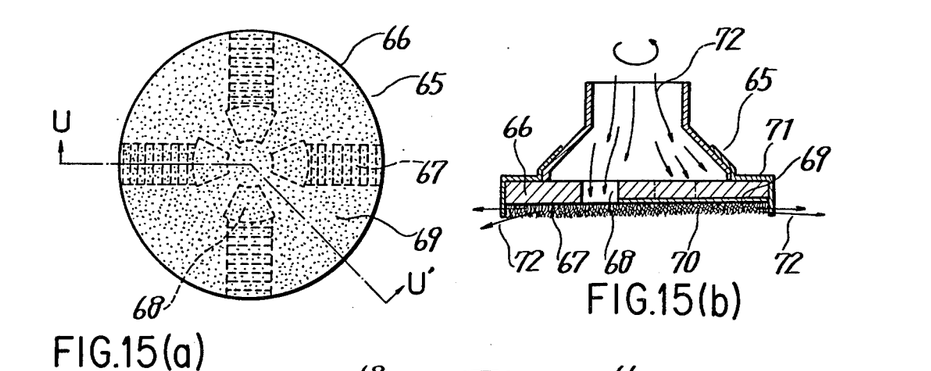
Figure 15C:
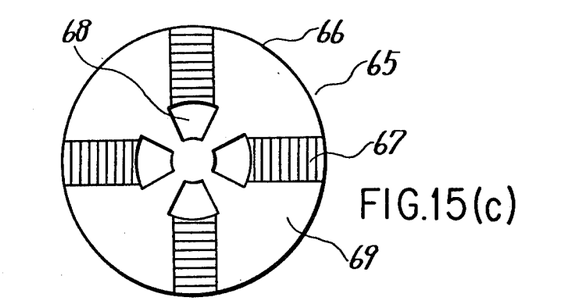

The electrode tool may further be arranged as shown in FIG. 15, in which an electrode tool 65 is rotated by a driving device and a circular electrode 66 is disposed under the electrode tool 65. Electrode faces 67 for electrolytic operation are formed in the cross shape under the electrode 66. A plurality of electrolyte outlets 68 are disposed in the electrode 66 therethrough. Electrically insulating adhesives 69 are applied or adhered to the electrode 66 except the electrode faces 67 disposed under the electrode 66 and the outlets 68. Water-permeable and electrically insulating abrasive matter 70 is attached to the electrode 66 with the adhesives 69, and may be formed of for example nonwoven or woven abrasive fabric, to which abrasive powder may also be attached.

An electrically insulating film 71 may be formed of paints. An electrolyte 72 is compressively sent from an electrolyte supply device through the driving shaft of the electrode tool 65, and supplied to the gap between the electrode faces 67 and a workpiece from the outlets 68 through the abrasive matter 70, and discharged to the outside of the electrode tool 65.

The cathode and anode of a direct current power supply or pulse power supply are connected to the electrode 66 and the workpiece, respectively.

The description herein below discusses a test in which mirror finishing was carried out by using the electrode tool 65 shown in FIG. 15. In the test, a 150mm dia. electrode, abrasive matter of 0.5 to 1 mm thickness and a 20% NaNO$_3$ solution as electrolyte were used. The electrolyte was supplied to the electrode tool at a ratio of 3 to 5 liters/min., a direct current voltage of 7 to 8 V was applied to the electrode and the workpiece, and the electrode was rotated at a rotation frequency of 400 rpm and contact-pressed to the surface to be polished at 0.2 kgf/cm$^2$.

The observation was made on variations in polishing speed and surface roughness of a 4 to 6 $\mu$m R Max. stainless steel (JIS SUS 304) as workpiece, by changing the ratio of the electrode insulated area to the area of the electrode faces for electrolytic operation.

Figure 16:
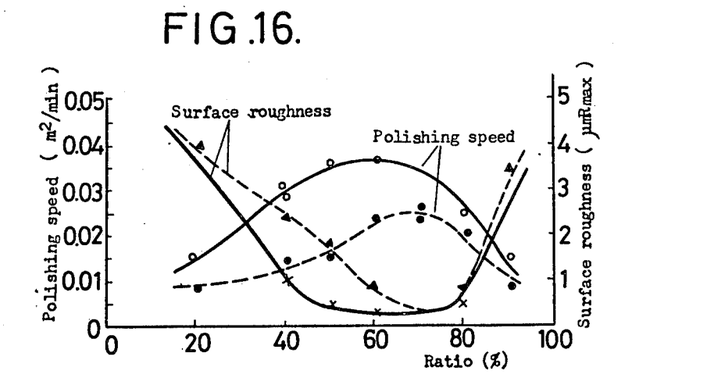
FIG. 16 shows a relationship between insulated electrode area ratio, and polishing speed & surface roughness.

In FIG. 16, the solid line shows the results of the test in which the electrode tool shown in FIG. 15 was used, while the broken line shows the results of the test using the electrode tool wherein to only insulated portions of abrasive matter were adhered.

As shown in FIG. 16, when the electrode tool shown in FIG. 15 is used, the polishing speed is improved by 10 to 25%, and an area of mirror surface of 1 $\mu$m R Max. or less is approximately doubled.

In FIG. 15, electrically insulating adhesives are applied to the electrode surface opposite to the workpiece, while similar operating effect may be obtained when an electrode for electrolytic operation is formed on an insulating disk in 20 to 60% of the disk area and the entire or the major portion of the disk is covered with abrasive material or matter.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of mirror finishing comprising:
   forming abrasive matter with an abrasive fabric which is resilient, water-permeable, has an insulating property and is used in an abrasive operation;
   arranging in the same plane as said abrasive matter an electrode radiately disposed to be used for electrolytic operation;
   using a movable electrode tool having an outlet for an electrolyte in which said abrasive matter and electrode to be used for electrolytic operation are alternately located;
   connecting said electrode tool and a workpiece to a cathode and to an anode of a direct current power supply, respectively;
   supplying an electrolyte to a gap between said electrode tool and said workpiece;
   sliding, while pressing, said electrode tool to a substantially plane large-area surface of the workpiece to be polished;
   intermittently applying electrolytic operation by said electrode into said surface to be polished;
   removing anodic passive films produced on convexed portions of said surface of the workpiece to be polished by electrolysis, by polishing action of said abrasive matter; and
   electrolyzing preferentially the convexed portions of said surface to the workpiece; whereby said electrolytic operation and said abrasion operation are alternately carried out so as to finish said surface of the workpiece to a mirror polished surface of which the maximum roughness is less than 0.4 $\mu$m.

2. A method of mirror finishing as set forth in claim 1, wherein the area of naked electrodes is 20 to 50% of that of said abrasive matter.

3. A method of mirror finishing as set forth in claim 1, wherein abrasive powder of not less than 5g/liter is mixed in the electrolyte.

4. A method of mirror finishing as set forth in claim 1, wherein a voltage of 5 to 12 V is applied to and a current of 0.5 to 2.5 A/cm$^2$ current density (electrolytic current/naked electrode area) is passed through the gap between the workpiece and said tool electrode.

5. A method of mirror finishing as set forth in claim 1, wherein the relative velocity of said electrode tool to a workpiece is within the range of 50 to 450 m/min. and contact pressure of said electrode tool to workpiece is within the range of 0.05 to 0.4 kgf/cm$^2$.

6. A method of mirror finishing as set forth in claim 1, wherein the direct current power supply for electrolysis is cut off when the relative velocity of said electrode tool to workpiece is decreased below a predetermined value.

7. A method of mirror finishing as set forth in claim 1, wherein an electrolyte tank is attached to said electrode tool and the quantity of electrolyte within said electrolyte tank is controlled, thereby to maintain a constant contact pressure of said electrode tool to the workpiece.

8. A method of mirror finishing as set forth in claim 1, wherein an insulating layer is provided on the surface of said electrode tool adjacent to a workpiece, the area of said layer being 40 to 80% of that of said surface of said electrode tool, and a substantial portion of said insulating layer is covered with abrasive matter.

9. A method of mirror finishing as set forth in claim 1, wherein an electrode for electrolytic operation is formed on the surface of said electrode tool adjacent to a workpiece, the area of said electrode being 20 to 60% of that of said surface of said electrode tool, and a substantial portion of said surface is covered with an insulating layer with abrasive matter.

10. A method of mirror finishing as set forth in claim 1, wherein the abrasive fabric is woven.

11. A method of mirror finishing as set forth in claim 1, wherein the abrasive fabric is nonwoven.

12. A method for mirror finishing as set forth in claim 1, wherein said movable electrode tool is a rotatable disk-shaped tool.

13. A method for mirror finishing as set forth in claim 1, wherein said movable electrode tool is a rotatable, cylindrically-shaped tool.

14. A method for mirror finishing as set forth in claim 1, wherein the electrode tool is connected to a cathode and the workpiece is connected to an anode of a direct current power supply.

15. A method for mirror finishing as set forth in claim 1, wherein the electrode tool is connected to a cathode and the workpiece is connected to an anode of an alternating current power supply.

16. An apparatus for mirror finishing comprising:
a movable electrode tool having an outlet for an electrolyte,
said electrode tool including an abrasive matter with an abrasive fabric which is resilient, water-permeable, has an insulating property and is used in an abrasive operation;
said abrasive matter being positioned in the same plane as an electrode radiately disposed which is used in an electrolytic operation;
said abrasive matter and said electrode being alternately positioned on said plane;
said electrode tool being connected to a cathode of a current power supply and a workpiece adapted to be connected to an anode of a current power supply;
means for supplying an electrolyte through said electrode tool and to a gap between said electrode tool and a workpiece;
said electrode tool being mounted so as to be adapted to be slid and pressed against a substantially plane large-area surface of a workpiece to be polished;
said electrode tool being adapted to be intermittently applied with an electrolytic operation by means of said electrode to the surface of a workpiece to be polished;
said abrasive matter of said electrode tool being adapted to remove an anodic passive film produced on the convexed portions of said surface of the workpiece to be polished; and
said electrode tool being adapted for electrolyzing preferentially the convexed portions of said surface of a workpiece to be polished;
whereby said electrolytic operation and said abrasion operation are alternately carried out so as to furnish said surface of the workpiece to a mirror polished surface of which the maximum roughness is less than 0.4 $\mu$m.

17. An apparatus for mirror finishing as set forth in claim 16, wherein the electrode tool is a rotatable disk-shaped tool.

18. An apparatus for mirror finishing as set forth in claim 16, wherein said movable electrode tool is a rotatable cylindrically-shaped tool.

19. An apparatus for mirror finishing as set forth in claim 16, wherein the electrode tool is connected to an anode of a direct current power supply.

20. An apparatus for mirror finishing as set forth in claim 16, wherein the electrode tool is connected to a cathode and the workpiece is connected to an anode of an alternating current power supply.

* * * * *